Figure 1:
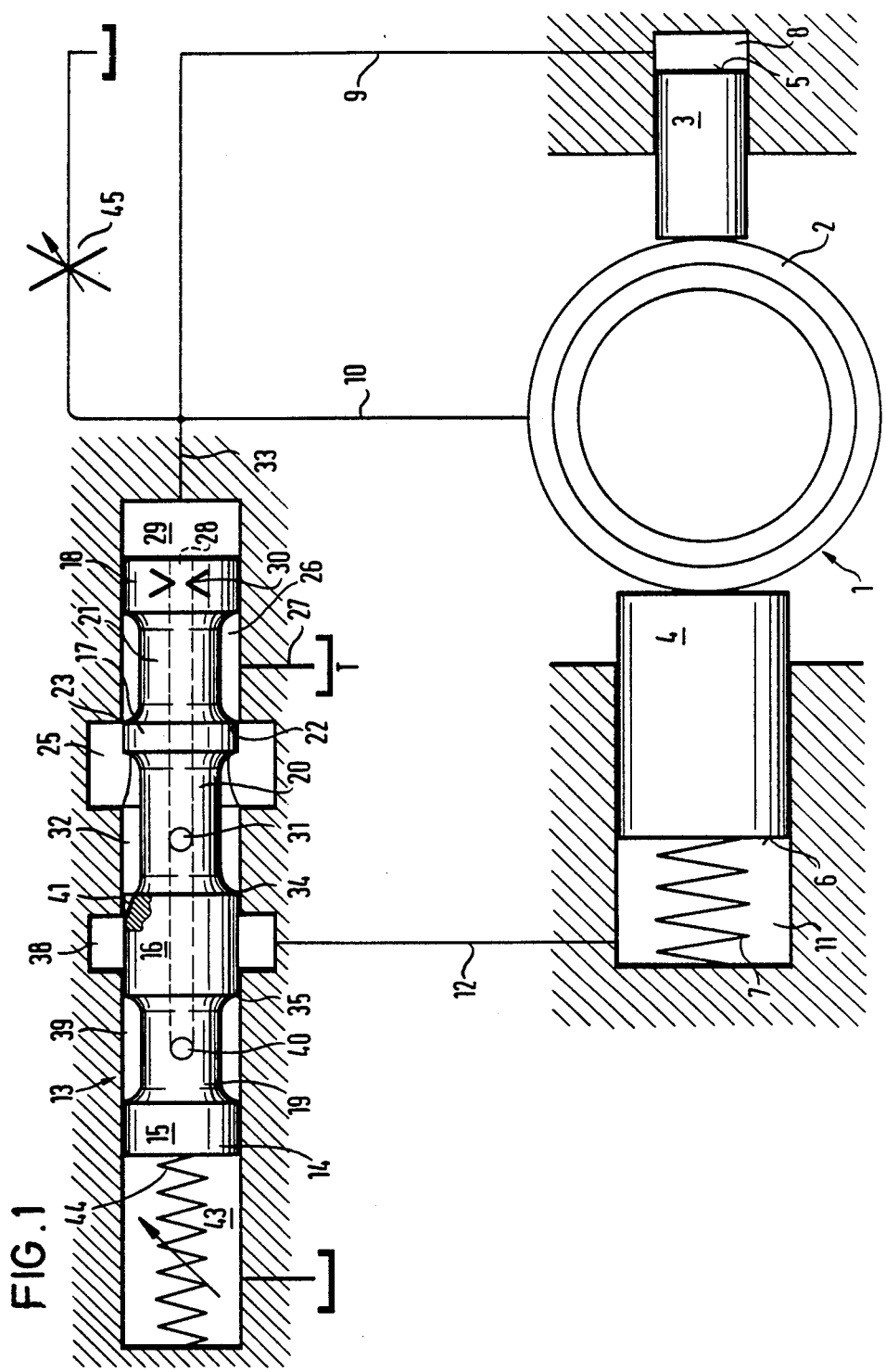

United States Patent [19]
Dantlgraber

[11] Patent Number: 4,737,078
[45] Date of Patent: Apr. 12, 1988

[54] CONTROL VALVE FOR A PUMP WITH VARIABLE DISPLACEMENT VOLUME

[75] Inventor: Jörg Dantlgraber, Lohr/Sackenbach, Fed. Rep. of Germany

[73] Assignee: Mannesmann Rexroth GmbH, Fed. Rep. of Germany

[21] Appl. No.: 22,744

[22] Filed: Mar. 6, 1987

Related U.S. Application Data

[62] Division of Ser. No. 825,209, Feb. 3, 1986, Pat. No. 4,674,956.

[30] Foreign Application Priority Data

Feb. 1, 1985 [DE] Fed. Rep. of Germany ....... 3503491

[51] Int. Cl.⁴ .............................................. F04B 49/08
[52] U.S. Cl. ..................... 417/220; 417/274; 418/26
[58] Field of Search .................. 417/220, 274; 418/26

[56] References Cited

U.S. PATENT DOCUMENTS

4,035,105 7/1977 Dantlgraber ...................... 417/220

FOREIGN PATENT DOCUMENTS

1403747 8/1961 Fed. Rep. of Germany.
131486 6/1978 Fed. Rep. of Germany.
251765 4/1981 Fed. Rep. of Germany.

*Primary Examiner*—Leonard E. Smith
*Attorney, Agent, or Firm*—Harness, Dickey & Pierce

[57] ABSTRACT

A control valve for a variable displacement pump is improved so that the levelling of the pressure fluctuations of the pump is better and quicker. For this purpose an additional control piston portion on the control piston of the control valve is used. Corresponding to the deflection of the control piston the constriction cross-section set by the control piston portion between the supply connected to the pump pressure line and a passage leading to the control space of the variable pump is varied so that the pressure rise in the control space of the pump and also the pressure drop is accelerated.

4 Claims, 6 Drawing Sheets

CONTROL VALVE FOR A PUMP WITH VARIABLE DISPLACEMENT VOLUME

This is a division of U.S. Pat. application Ser. No. 825,209, filed Feb. 3, 1986, now U.S. Pat. No. 4,674,956.

DESCRIPTION

The invention relates to a control valve for a pump having a variable displacement volume, for example a vane cell pump according to the preamble of claim 1.

With such a known control valve (DE-AS 2,516,765) the control stability is improved and even in the case of long pipes inadmissibly high oscillations of the system are suppressed. Even with small pressure fluctuations in the region of the desired value of the pump an improved damping of the control oscillations is achieved and pulsations of the pump in the control space are damped.

The aim of the present invention is to further improve the control in the presence of pressure fluctuations.

Proceeding from a known control valve this problem is solved in several embodiments by the features set forth in the characterizing clauses of the independent patent claims.

Whereas in the prior art between the pressure side of the vane cell pump and the piston spaces on either side of the second control piston portion a fixed throttle was provided, a throttle variable with the piston movement is now provided. This achieves that when the pumping pressure drops the throttle cross-section is increased or conversely when the pumping pressure increases the throttle cross-section is diminished, the rise of the control pressure in the control space or the reduction of the control pressure thereby being accelerated and thus pressure-fluctuations more rapidly levelled out by the control valve without control oscillations occurring. On the whole, with the control valve according to the invention a higher control gain can be obtained.

For clarity in FIG. 1 the known control valve for a vane cell pump is shown in section.

In FIGS. 2-6 several embodiments of a control valve constructed according to the invention are illustrated in section.

In FIG. 1 the adjustable stator 2 of a vane cell pump 1 is subjected in the direction of increasing displacement to a hydraulically actuable adjusting piston 4 and in the direction of smaller displacement to a hydraulic adjusting piston 3 whose effective area 5 subjected to pressure is smaller than the area 6 subjected to pressure of the opposite adjusting piston 4. The adjusting piston 4 is additionally loaded by a spring 7 in the direction of the stator 2. The control space 8 for the adjusting piston 3 is connected via a conduit 9 directly to the pressure conduit 10 of the vane cell pump. The control space 11 for the adjusting piston 4 communicates via a conduit 12 with the control valve 13.

The control piston 14 of the control valve is divided into the control piston portions 15, 16, 17, 18 with piston necks 19, 20, 21 therebetween. Between the control piston portions piston spaces 26, 32, 39 are formed. The piston spaces 32 and 39 communicate via radial bores 31 and 40 and an axial blind bore 28 in the control piston 14 with the end space 29 which is connected via a supply passage 33 to the pressure conduit of the pump 10. The control piston 14 is acted upon by a spring 44 in the end space 43 in the opposite sense to the pressure in the end space 29. The piston space 26 is connected via a discharge passage 27 to a tank T. The transfer of control fluid from the piston space 32 via a housing recess 25 into the piston space 26 and thus to the tank is set by the first control piston portion 17 whose control edge 22 cooperates with the control edge 23 of the recess 25.

The conduit 12 leading to the control space 11 opens into a recess 38 whose connection to the piston spaces 32 and 39 is effected by means of the second control piston portion 16. In the position illustrated of the control piston 14, which corresponds to a stationary state of the pump, the second control piston portion 16 is substantially in the middle with respect to the passage 38.

The control piston portion 16 comprises at least one groove 41 as connection between the passage 38 and the piston space 32.

Provided in the blind bore 28 of the control piston 14 is a throttle 30. In the piston spaces 32 and 39 on either side of the control piston portion 16 a control pressure is thus obtained which is proportional to the pumping pressure defined by the throttle 30.

The mode of operation of the known control valve is as follows: if the operating fluid amount at the load 45 increases the pumping pressure in the pressure conduit 10 drops and the control piston is displaced by the spring 44 in the direction of the end space 29 by such an amount that the control edge 35 opens and connects the control space 39 to the passage 38 whilst the control edge 22 interrupts the connection to the tank T. Consequently, the control pressure obtaining in the piston space 39 acts on the control space 11 for the adjusting piston 4 of the pump and as a result the stator 2 is displaced in the direction of maximum displacement. If the pumping pressure increases again the connection between the piston space 39 and the control space 11 of the pump is interrupted. The control space 11 communicates with the piston space 32 only via the groove acting as damping throttle.

If the load 45 abruptly reduces the consumption of operating fluid the pumping pressure suddenly rises so that the control piston 14 is displaced against the force of the spring 44 by a correspondingly large amount. As this is done the control edge 34 opens the connection of control space 11 to the piston space 32, bypassing the groove 41, and said space 32 in turn is connected by the simultaneous opening of the control edge 22 to the tank T. By the resulting pressure relief in the control space 11 the stator 2 is displaced in the direction of minimum displacement of the variable pump 1, the pumping pressure being reduced with diminishing displacement so that the control piston is again displaced in the direction of the end space 29. By the groove 41 the further adjustment of the adjusting piston 4 is damped and overswing of the control piston effectively suppressed. The damping is thus effected in particular when the adjusting operation to be controlled is almost concluded. If the groove 41 has a variable cross-section the damping effect increases the further control piston 14 moves in the direction of the end space 29.

Figure 2:
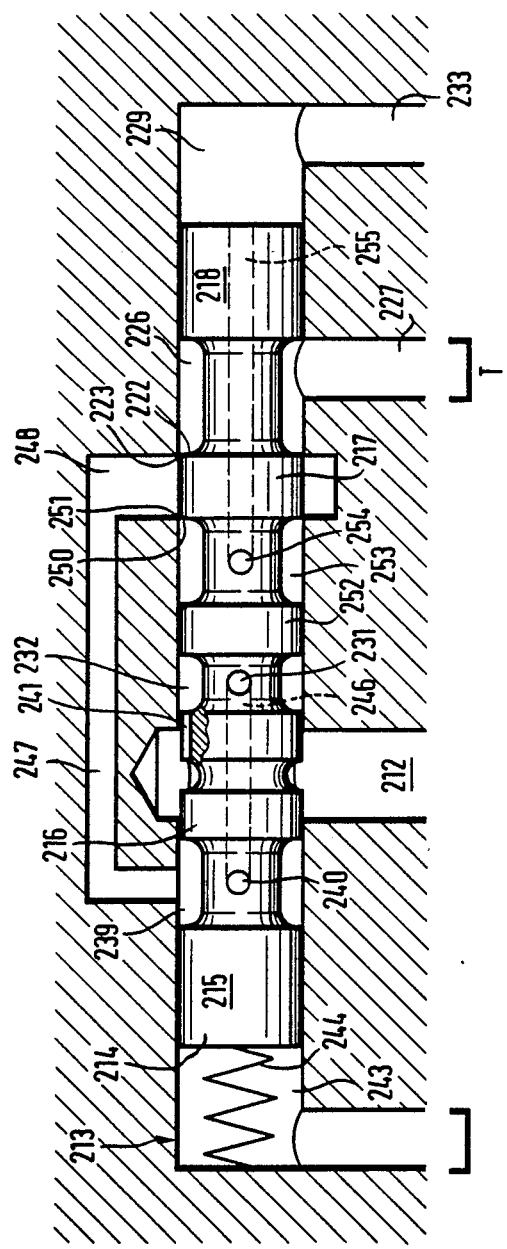

FIG. 2 shows a first embodiment of the control valve 213 according to the invention and components of the valve corresponding to FIG. 1 are provided with the same reference numerals except for a preceding two. Thus, the passage 212 leads to the control space 11 of the adjusting pump, the passage 227 to the tank T and the passage 233 to the pressure conduit 10 of the pump. The control piston portion 217 blocks with its control edge 222 cooperating with the housing edge 223 of a passage 248 the discharge to the passage 227 just when the second control piston portion 216 is substantially symmetrical with respect to the passage 212.

In FIG. 2 the piston space 232 is connected via a radial bore 231, an axial passage 246 and a radial bore 240 to the piston space 239 which is connected via a connection 247 to the passage 248. Provided on the side of the control piston 217 opposite the control edge 222 is a control edge 250 which cooperates with the housing edge 251. The piston space provided between the control piston portion 217 and a further piston portion 252 is connected via a radial bore 254 and a blind bore 255 to the pressure space 229 and thus to the supply passage 233 from the pump.

If the pumping pressure drops in the manner already explained and the control piston 214 is displaced by the spring 244 in the direction of the end space 229, the control edge 250 opens the connection from the piston space 253 to the passage 248. If the control piston portion 216 then connects the piston space 239 to the control passage 212 the control space of the pump is subjected to the control pressure set corresponding to the deflection of the control piston at the throttle point 250, 251. Thus, the greater the deflection of the control piston the higher the pressure which is set in the control space of the pump so that the pressure increase takes place correspondingly rapidly and the control operation is accelerated.

In the reverse control operation, when the pumping pressure in the end space 229 rises, on displacement of the control piston 214 to the left the throttle point 250, 251 is blocked and the discharge 227 is connected to the passage 247 via the control edge 222 so that the pressure reduction in the control space of the pump is also accelerated.

It is further apparent from FIG. 2 that the damping effect of the groove 241 is present in the same manner as in FIG. 1.

Figure 3:
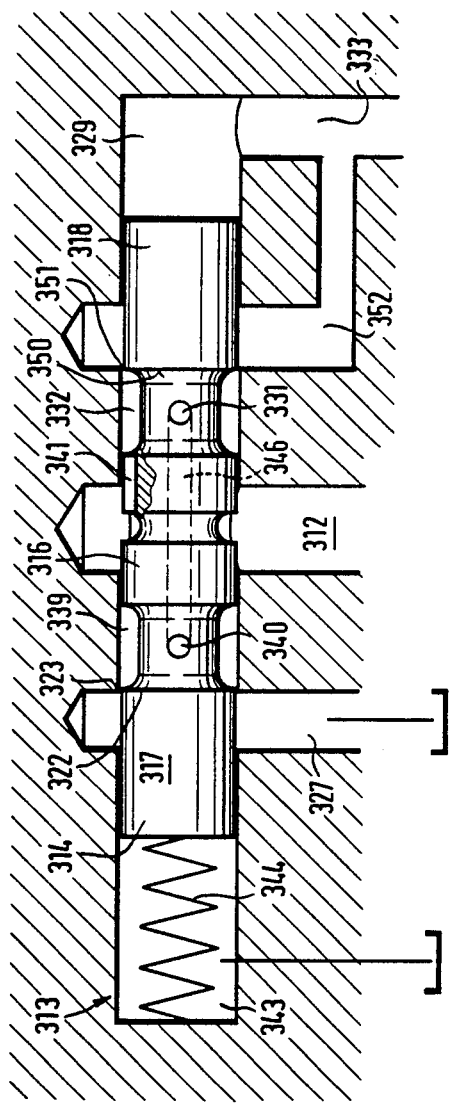

In the embodiment of FIG. 3 as well components identical to FIG. 1 are provided with the same reference numerals but preceded by a three.

The control piston 314 comprises three control piston portions 316, 317, 318. The connection of the conduit 312 leading to the control space of the variable pump to the piston spaces 332 and 339 is again via the control piston portion 316. The two piston spaces are again connected together via the radial bores 331 and 340 and by the axial passage 346 in the control piston. The groove 341 provides the damping effect.

The discharge 327 to the tank is effected by the control edge 322 which cooperates with the housing edge 323 and which in FIG. 3 is formed on the control piston portion 317.

The connection of the piston space 332 to the supply passage 333, which is connected to the pressure conduit of the pump, is however via the control edge 350 which cooperates with the housing edge 351 and which is formed on the control piston portion 318. Via this variable throttle point 350, 351 the connection is established to a passage 352 which is connected to the supply passage 333.

The control operation is effected in the manner already described. If due to an increased need of operating fluid the pumping pressure diminishes the control piston 314 is pushed by the spring 344 towards the end face 329, the throttle point 350, 351 opens corresponding to the control piston stroke and control fluid enters the piston space 332 and passes to the piston space 339 via the connection 331, 346, 340 so that via the control piston portion 316 opening the connection to the control passage 312 the control space of the pump is subjected to pressure.

If however the pumping pressure increases the control piston 314 moves against the force of the spring 344 to the left, the throttle point 350 and 351 is closed and the discharge to the tank via the throttle point 322, 323 opened and thus the connection between the control passage 312 from the control piston portion 316 to the piston space 339 and thus to the discharge 327 opened so that the pressure in the control space can diminish and the pump is moved in the direction of smaller displacement.

In both cases in the event of large control deviations corresponding to a large stroke of the control piston 314 the adjustment of the pump can take place unthrottled because the control piston portion 316 opens the connection of the piston spaces 339, 332 to the passage 312 whilst with a small control deviation the adjustment of the pump is throttled by the throttle groove 341.

Figure 4:
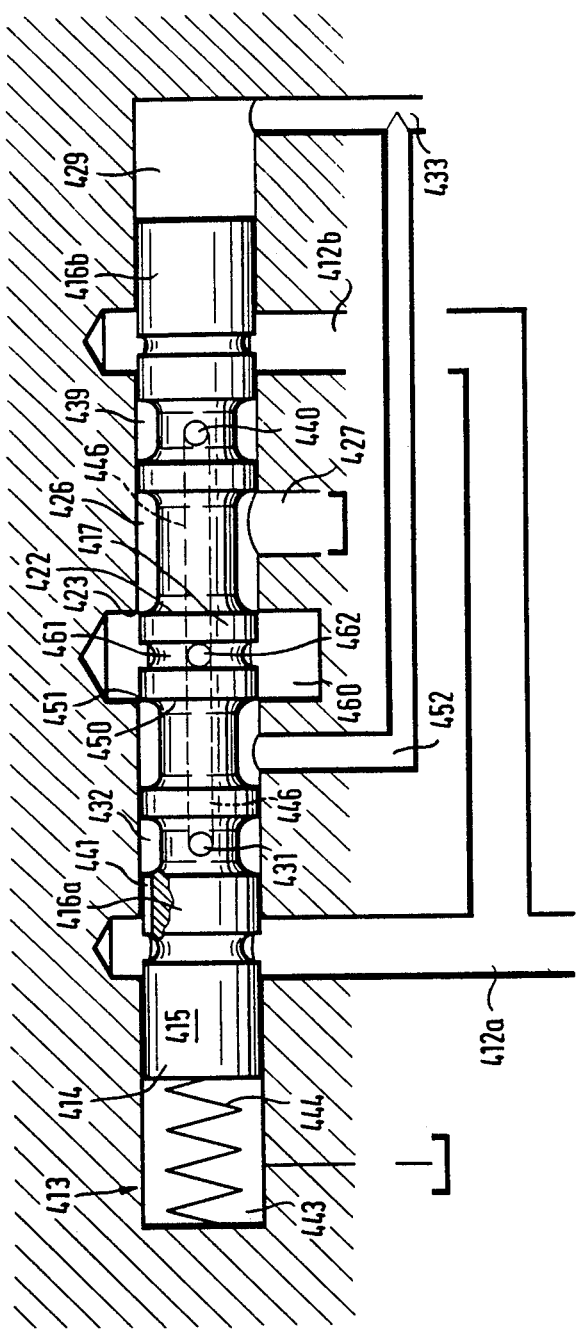

FIG. 4 shows a further embodiment of the control valve 413.

A peculiar feature of the control valve 414 is that the second control piston portion is divided into two subportions 416a and 416b. The subportion 416a controls the connection between the piston space 432 and the control passage 412a, and the subportion 416b controls the connection between the piston space 439 and the control passage 412b. Both control passages 412a, 412b are connected together and lead to the control space of the variable pump. Furthermore, both piston spaces 432 and 439 are connected together via the radial bores 431 and 440 and the axial passage 446 in the control piston. In the subportion 416 the groove 441 is provided which may however alternatively be disposed in the subportion 416b or in 416a and 416b.

The connection in the discharge passage 427 to the tank is controlled by the control edge 422 of the control piston portion 417 cooperating with the housing edge 423. The oppositely disposed control edge 450 of the control piston portion 417 cooperates with the housing edge 451 and controls the connection from a supply passage 452 to a housing recess 460 which via an annular groove 461 in the control piston 414 and a radial bore 462 opening into the axial passage 446 is connected to the piston spaces 432 and 439.

If the pumping pressure drops due to an increased need for operating fluid the spring 444 displaces the control piston 414 in the direction of the end space 429. Corresponding to the stroke of the control piston the throttle 450, 451 opens and 422, 423 closes and the piston spaces 432 and 439 are subjected to the control pressure set by the throttle point 450, 451 and 422, 423. Via the opening connection between the piston space 439 and control passage 412b the control space of the pump is subjected to pressure and the pump displaced in the direction of maximum displacement.

If however the need for operating fluid drops and the pressure in the supply passage 433 increases, the control piston is deflected into the opposite direction, the throttle point 450, 451 closing and the throttle point 422, 423 opening the discharge passage 427 to the tank. Via the subportion 416a the connection of the control passage 412a to the piston space 432 and the recess 460 is established so that the pressure in the control space of the pump can diminish and the latter is adjusted in the direction of smaller displacement.

On return of the control piston to the starting position illustrated the necessary damping is effected by the groove 441.

Figure 5:
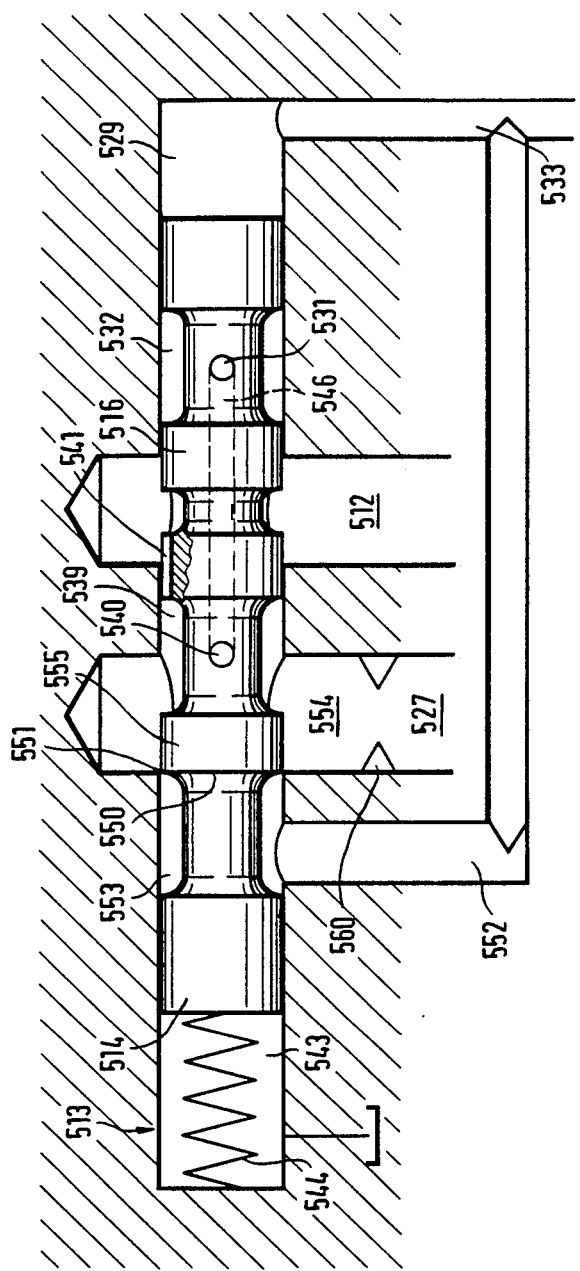

A further embodiment is illustrated in FIG. 5.

The supply conduit 533 connected to the pump conduit 11 is connected to a supply passage 552 which opens into a piston space 553. The connection between the piston space 553 to a recess 554 of the valve housing is effected via a control edge 550 which is provided at a control piston portion 555 and which cooperates with a housing edge 551 of the recess 554.

In the embodiment acording to FIG. 5 the throttle point for the flowing of the control fluid into the discharge passage to the tank is not provided at the control piston 514. Instead, a fixed throttle point 560 is provided which is disposed in the valve housing and connects the recess 554 to the discharge passage 527 to the tank T.

The piston spaces 532 and 539 on either side of the second control piston portion 516 are in turn connected together via the radial bores 531 and 540 and the axial passage 546 in the control piston. In addition, the piston space 539 is in permanent communication with the recess 554.

If the demand for operating fluid increases so that the pumping pressure drops, the control piston 514 is pushed by the spring 544 in the direction of the end space 529. The throttle point 550, 551 opens and corresponding to the stroke of the control piston control fluid passes from the supply passage 552 into the recess 554 and from there via the piston space 539 and via the control piston portion 516 freeing the cross-section to the control passage 512 into the latter and thus into the control space of the pump. By the pressure rise in the control space the pump is adjusted in the direction of greater displacement.

If the control operation takes place in the reverse direction, i.e. if by reduced demand for operating fluid the pumping pressure increases, the control piston 514 is displaced to the left and the connection between the supply passage 552 to the recess 554 closed by the control piston portion 555. The pressure reduction from the control space of the pump via the control passage 512 then takes place via the control piston portion 516, the piston space 532 and the connection 531, 556, 540 in the control piston 514 to the piston space 539 and thus to the recess 554 and via the throttle point 560 into the discharge passage 527 leading to the tank T. The throttle point 560 is so dimensioned that the pressure reduction takes place rapidly enough whilst said throttle point 560 prevents an undesirable pressure drop in the recess 554 when for increasing the pressure in the control space of the pump the throttle point 550, 551 opens the connection from the supply passage 552 to the piston space 539.

Figure 6:
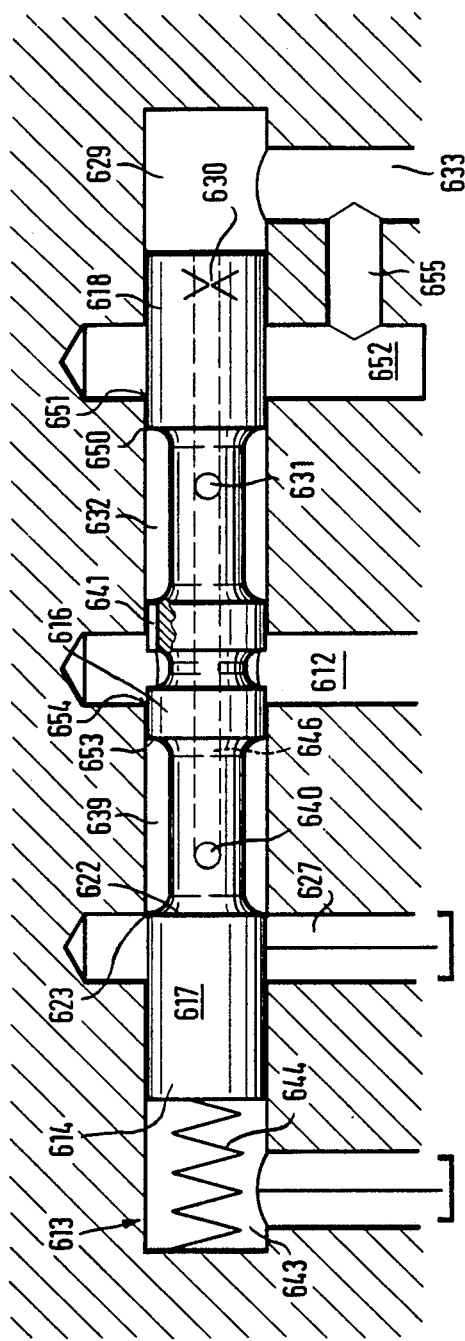

FIG. 6 shows a further embodiment of the control valve 613. This control valve is constructed similar to that in FIG. 3 but instead of the two-edge control formed by the edges 350, 351 and 322, 323 in this case a single-edge control is provided comprising a constant supply throttle 630 and a variable discharge throttle 622, 623.

In the position of the control piston in which the control deviation is practically zero (control edges 622, 623 free a very small portion of the flow cross-section) the control edge 650, 651 acting parallel to the constant supply throttle 630 is closed.

If, proceeding from a state of equilibrium (control deviation close to zero), due to a sudden increase in the amount of operating fluid required, the pumping pressure drops rapidly the spring 644 pushes the control piston 614 in the direction of the end space 629 until the control edge 622, 623 is closed and the edges 650, 651 and 653, 654 are opened.

Working medium under pressure thus passes from the space 629 subjected to the system pressure via the connection 655 to the housing space 632 and via 631, 646, 640 and the edges 653, 654 to the control passage 612.

In this manner the pump is rapidly adjusted in the direction of larger displacement.

As a result, the pumping pressure obtaining in 629 rises and displaces the piston against the spring 644 until the edge 650, 651 closes. The operating or working medium necessary for adjustment in the direction of greater displacement must now flow through the throttle 630 and further via 646, 640, 639 and the still opened edge 653, 654 to the control space 612 and consequently the pump becomes slower. On further increase of the pumping pressure the control piston portion 616 closes the connection from 639 to 612 by covering the edges 653, 654.

The operating medium necessary for the last part of the adjustment in the direction of larger pump displacement must now pass via the throttle 630, 646, 631, 632 and the grooves 641 to the control space 612 and consequently the adjustment operation takes place particularly slowly due to the effect of 620 and 641.

Consequently, the settling operation to the desired pressure value takes place without pronounced overshoot.

As an alternative to the function described the closing of the edges 651, 652 and 653, 654 can also take place simultaneously. A design is also possible in which (with respect to the operation just described) the edge 653, 654 closes before the edge 650, 651.

The reverse control operation which takes place when the pumping pressure increases is the same as for the embodiment of FIG. 3 and already described above.

Instead of the passages provided as bores in the valve housing annular housing recesses may also be provided in the valve housing which cooperate with the control piston portions. The throttle groove 214, 341, 441, 541 and 641 is disposed in each case on the side of the second control piston portion which faces the piston space 232, 332, 432, 532, 632 which for reducing the pressure in the control space of the pump is connected to the discharge passage 227, 327, 427, 527 and 627 respectively leading to the tank. As illustrated in FIG. 5, however, the groove 541 can also be arranged on the side of the control piston portion 516 facing the piston space 539, i.e. which for increasing the pressure in the control space of the pump is connected via the throttle point 550, 551 to the supply passage 552 from the pressure side of the pump. The throttle groove can thus be arranged on one side on the left or right as well as on both sides or made continuous and also be disposed as throttle in a housing-side or piston-side passage. The effect is always the same, i.e. a correspondingly greater throttling is achieved towards the end of the control levelling operation.

I claim:

1. Control valve for a variable pump having adjusting means comprised of at least one adjusting piston operated by control fluid acting in a control space, said control valve comprising a housing and controlling the pressure of said control fluid in said control space, a control piston in said housing and subjected in one direction to the output pressure of said variable pump and in the other direction to the action of a control spring, said control piston having a first control piston portion adapted to connect said control space to a space of lower pressure level through a discharge passage, said control piston further having a second control piston portion adapted to communicate said control fluid to said control space, said second control piston portion cooperating with a passage communicating with said control space, said second piston control portion being substantially symmetrical to said passage when a control edge of said first control piston portion has just closed said discharge passage to said space of lower pressure level, said second control piston portion being formed with at least one groove for communicating said passage to a one piston space adjacent said first control piston portion and connected via a throttle to a supply passage from the pressure side of the variable pump, characterized in that a throttle is formed by a control edge of said first control piston portion, said control edge controlling said supply passage and lying opposite said control edge of the first control piston portion, the throttle action of the two control edges being inversely proportional to each other.

2. Control valve according to claim 1, characterized in that the second control piston portion is divided into two subportions, one of which controls the connection of the first piston space to the control space and the other the connection of a second piston space to the control space of the pump, both piston spaces being connected together and to a recess cooperating with a further control piston portion disposed centrally with respect to the subportions, and that at sides of said further control piston portion remote from each other control edges are provided which cooperate with the recess for controlling a connection to the supply passage and the discharge passage, respectively.

3. Control valve for a variable pump having adjusting means comprised of at least one adjusting piston operated by control fluid acting in a control space, said control valve comprising a housing and controlling the pressure of said control fluid in said control space, a control piston in said housing and subjected in one direction to the output pressure of said variable pump and in the other direction to the action of a control spring said control piston having a first control portion for conducting said control fluid to said control space, said first control piston portion cooperating with a passage communicating with said control space, the width of said passage being less than that of said first control piston portion, said first control piston portion being substantially symmetrical to said passage, and said first control piston portion being formed with at least one groove for connecting said passage to a one piston space adjacent said first control piston portion and connected via a throttle to a supply passage from the pressure side of said variable pump, characterized in that said throttle is formed by a control edge of a further control piston portion controlling said supply passage to piston spaces, said throttle action being increased when the pressure in said control space diminishes or vice versa, and a further throttle in a discharge passage to connected to a space of lower pressure.

4. Control valve according to claim 3, characterized in that the one piston space is in constant communication with a housing recess having a housing edge cooperating with the control edge of the further control piston portion, and the one piston space is connected via a connection to a piston space disposed on the other side of said control piston portion.

* * * * *